(12) United States Patent
Abgrall et al.

(10) Patent No.: US 8,920,036 B2
(45) Date of Patent: Dec. 30, 2014

(54) TEMPORARY SUPPORT MEMBER FOR A SENSOR UNIT OF A BEARING, SENSING SUB-ASSEMBLY AND BEARING ASSEMBLY COMPRISING SUCH A SUPPORT MEMBER

(71) Applicants: Loic Abgrall, Larçay (FR); Alexandre Taillepied, Saint Pierre des Corps (FR); Olivier Verbe, Tours (FR)

(72) Inventors: Loic Abgrall, Larçay (FR); Alexandre Taillepied, Saint Pierre des Corps (FR); Olivier Verbe, Tours (FR)

(73) Assignee: Aktie Bolaget SKF, Gothenburg (SE)

( * ) Notice: Subject to any disclaimer, the term of this patent is extended or adjusted under 35 U.S.C. 154(b) by 0 days.

(21) Appl. No.: 13/894,318

(22) Filed: May 14, 2013

(65) Prior Publication Data
US 2013/0301966 A1    Nov. 14, 2013

(30) Foreign Application Priority Data

May 14, 2012   (EP) ................................... 12305539

(51) Int. Cl.
| | |
|---|---|
| F16C 32/00 | (2006.01) |
| F16C 41/04 | (2006.01) |
| F16C 41/00 | (2006.01) |
| G01P 1/02 | (2006.01) |
| F16M 13/02 | (2006.01) |
| F16C 19/00 | (2006.01) |
| G01P 1/00 | (2006.01) |
| G01P 3/44 | (2006.01) |

(52) U.S. Cl.
CPC ................. *F16C 41/007* (2013.01); *G01P 1/02* (2013.01); *F16M 13/02* (2013.01); *F16C 19/00* (2013.01); *G01P 1/00* (2013.01); *G01P 1/026* (2013.01); *G01P 3/443* (2013.01)
USPC .......................................................... 384/448

(58) Field of Classification Search
CPC ......... F16C 41/00; F16C 41/007; G01P 3/443
USPC ........................ 384/448; 73/493, 494, 866.5; 248/346.01, 346.03, 346.06, 346.5; 324/174, 207.25, 173, 207.2
See application file for complete search history.

(56) References Cited

U.S. PATENT DOCUMENTS

| | | | | |
|---|---|---|---|---|
| 5,310,266 | A  * | 5/1994 | Coux et al. ..................... | 384/448 |
| 6,773,164 | B2 * | 8/2004 | Meeker et al. ................. | 384/448 |
| 7,441,457 | B2 * | 10/2008 | Jaklin ............................. | 73/494 |
| 7,503,214 | B2 * | 3/2009 | Machill ........................... | 73/494 |
| 2003/0179967 | A1 | 9/2003 | Meeker et al. | |

FOREIGN PATENT DOCUMENTS

| | | | |
|---|---|---|---|
| EP | 1672373 | A1 | 6/2006 |
| EP | 1933155 | A1 | 6/2008 |

* cited by examiner

*Primary Examiner* — Phillip A Johnson
(74) *Attorney, Agent, or Firm* — Bryan Peckjian; SKF USA Inc. Patent Department

(57) ABSTRACT

This temporary support member for a sensor unit of a bearing assembly is stackable with a similar support member when a sensor unit is mounted on each one of the support member and the similar support member.

16 Claims, 7 Drawing Sheets

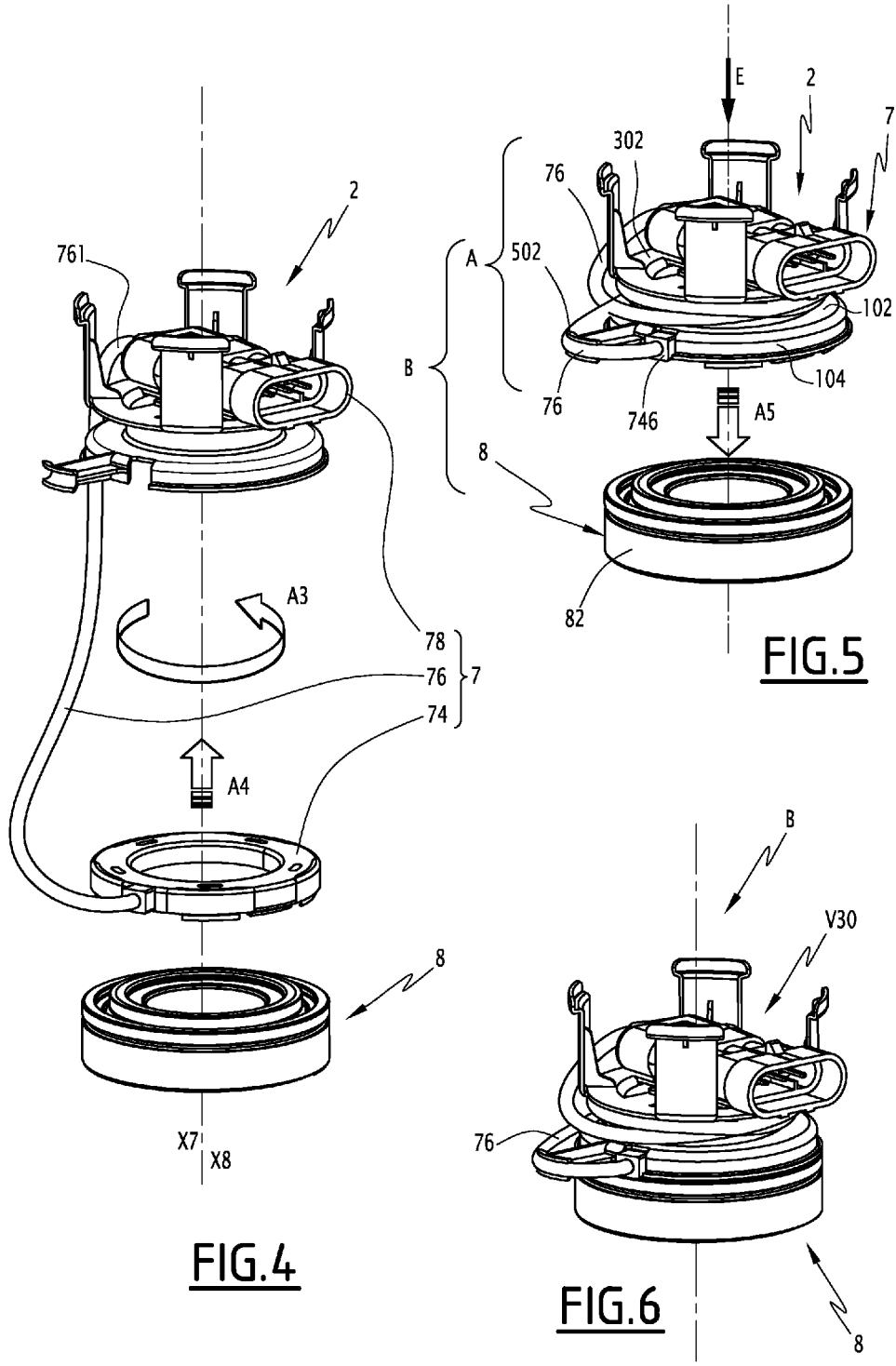

TEMPORARY SUPPORT MEMBER FOR A SENSOR UNIT OF A BEARING, SENSING SUB-ASSEMBLY AND BEARING ASSEMBLY COMPRISING SUCH A SUPPORT MEMBER

CROSS-REFERENCE TO RELATED APPLICATIONS

This application claims priority to European patent application no. 12305539.4 filed May 14, 2012, the contents of which are fully herein incorporated by reference.

FIELD OF THE INVENTION

This invention relates to a temporary support member for a sensor unit of a bearing. This invention also relates to a sensing-sub assembly comprising a sensor unit with a sensor body, a cable connected to this sensor body, a connector mounted at a free end of this cable and a temporary support member. Finally, the invention relates to a bearing assembly comprising a bearing and a sensing sub-assembly as mentioned here-above.

BACKGROUND OF THE INVENTION

In the field of bearings, it is known to use a tachometer in order to determine a rotation parameter, such as a rotation speed, of a rotating part supported by a bearing with respect to a non rotating pai-t. As explained in EP-A-1 933 155, one can use an encoder washer with magnetic poles fast in rotation with a rotating ring of a bearing, and one or several sensors distributed in a sensor body around the encoder washer or located in front of it. Such a sensor body is fed with electric power via a cable which is connected to the sensor body, generally to a printed circuit board which holds the sensors and some other electronic components within the sensor body. This cable can also be used to convey the output signals of the sensors towards an electronic control unit located outside the sensor body. Such a cable is provided, at a free end opposite to the sensor body, with a connector for connection to a power supply and/or to a network for distributing electronic signals. Depending on the intended use of the sensor unit, the cable has a length which generally varies between 250 and 850 mm and the connector is adapted to the environment of the sensor unit.

Such a cable prevents, to a large extent, automation of the manufacturing process of sensor units insofar as, when several sensor units are stored in a box, their respective cables tend to interweave. Moreover, when one holds a sensor unit by its sensor body, the cable and the connector tend to hang on a side of the sensor unit. It is thus difficult for a robot to grasp and move a sensor unit on a production line for instrumented bearing assemblies. The cables of the known sensor units are also cumbersome for the operators who have to install such sensor units on some bearings, in order to build instrumented bearing assemblies.

SUMMARY OF THE INVENTION

This invention aims at solving these problems with a new support member which is efficient to hold a sensor unit in a configuration compatible with the creation of a stack of bearing assemblies including each a sensor unit or a stack of sensing sub-assemblies including each such a sensor unit, the bearing assemblies or sensing sub-assemblies being ready for use.

To this end, the invention concerns a temporary support member for a sensor unit of a bearing assembly, this support member being stackable with a similar support member when a sensor unit is mounted on each of these support members.

Thanks to the invention, it is possible to store several sensor units, possibly with the associated bearing, in a pile or stack, which facilitates automation of a manufacturing process making use of such sensor units or bearing assemblies.

In the present description, a rotation parameter is representative of the rotation movement of an encoder washer of a bearing assembly. Such a parameter can be an angle, a speed, a displacement, an acceleration or a vibration.

According to further aspects of the invention which are advantageous but not compulsory, this temporary support member can incorporate one or several of the following features, taken in any admissible configuration:

The temporary support member comprises several curved portions forming each a recess for accommodating a part of a sensor body belonging to a sensor unit mounted on another temporary support member or a part of a bearing cooperating with a sensor unit mounted on another temporary support member.

The curved portions are provided at the free ends of some arms which extend parallel to a central axis of the support member and define between them a volume for accommodating a connector belonging to the sensor unit.

Each recess is formed by a first cylindrical wall centered on the central axis and a second wall perpendicular to this central axis.

The temporary support member comprises a first part for accommodating at least a part of a sensor body of the sensor unit, a second part for accommodating, in a coiled configuration, a cable connected to the sensor body and a third part for accommodating a connector mounted at a free end of the cable.

The arms belong to the third part of the temporary support member.

The first part and the second part are circular and centered on a common axis. Along this common axis, the second part is located between the first and third parts.

The first, second and third parts are made in a single piece of synthetic material.

The temporary support member includes an adaptor for holding the connector in position within the third part.

The invention also concerns a sensing sub-assembly comprising a sensor unit with a sensor body, a cable connected to the sensor body and a connector mounted at a free end of this cable. This sensing sub-assembly also includes a temporary support member as mentioned here-above. The sensor unit is mounted onto this support member.

Advantageously, the temporary support member includes a first, a second and a third part as mentioned here-above and an axial dimension, measured parallel to a central axis of the support member, of a volume defined by the third part for accommodating the connector of the sensor unit is larger than a dimension of this connector which is parallel to this axis when the connector is received within this volume.

When the temporary support member defines three parts as mentioned here-above, it is possible to have the sensor body of a sensor unit received within a first volume of the first part, a cable of the sensor unit wound in a second volume of the second part and a connector of the sensor unit received within a third volume of the third part.

Finally, the invention relates to a bearing assembly comprising a bearing having a rotating ring, a non-rotating ring and an encoder washer mounted on the rotating ring. This bearing assembly also comprises a sensing sub-assembly as mentioned here-above, mounted on the non-rotating ring of the bearing.

According to an advantageous aspect of the invention, the temporary support member comprises several curved portions as mentioned here-above and their recesses are distributed around a central axis of the temporary support member with a maximum diameter which is substantially identical to the outside diameter of the bearing or to the outside diameter of the sensor body.

BRIEF DESCRIPTION OF THE DRAWINGS

The invention will be well understood on the basis of the following description which is given in correspondence with the annexed figures and as an illustrative example, without restricting the object of the invention. In the annexed figures:

FIG. 2 is a perspective view of the support member of FIG. 1, at a smaller scale, in use with a sensor unit of a bearing assembly, at a first step of a mounting process;

FIGS. 3 to 6 are perspective views similar to FIG. 2 for further steps of the mounting process;

DETAILED DESCRIPTION OF THE INVENTION

Figure 1:
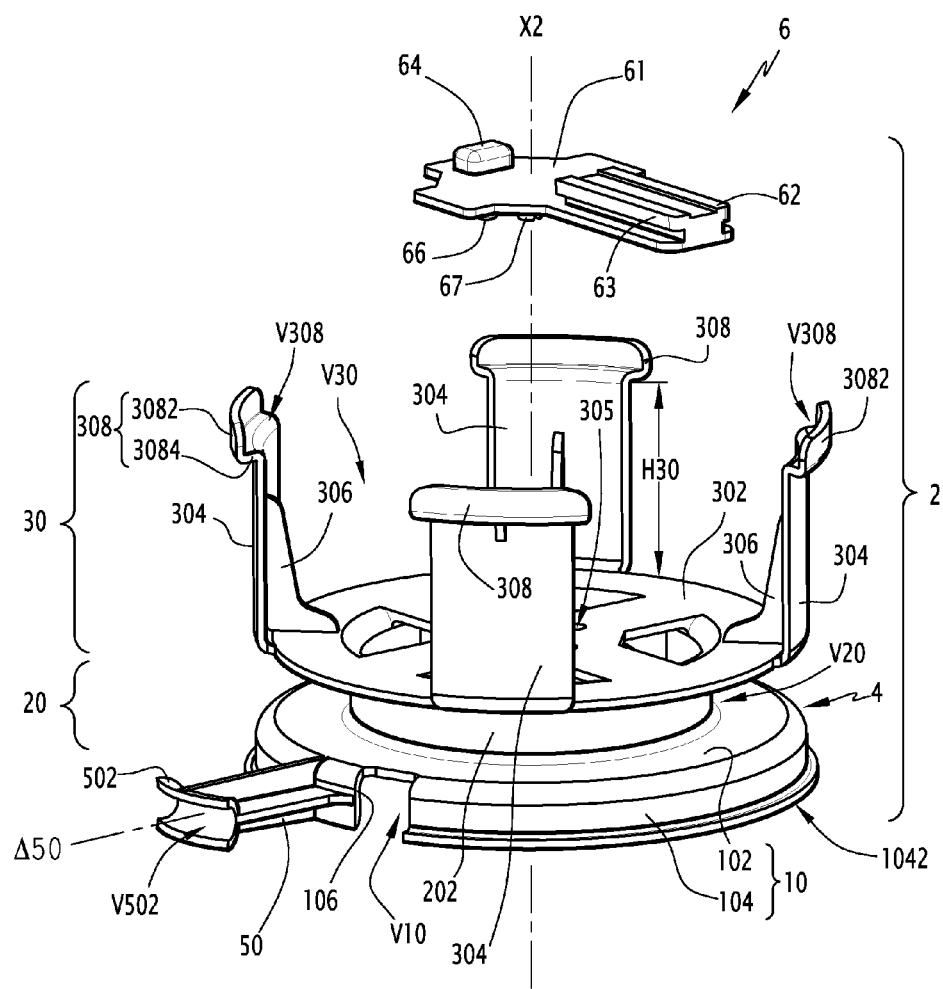
FIG. 1 is a perspective view of a temporary support member according to the invention.

The support member 2 represented on FIG. 1 includes a holder 4 and an adaptor 6, each made of a single piece of synthetic material, such as polyamide.

X2 denotes a central axis of support member 2.

Holder 4 has a first part 10 made by an annular portion 102 perpendicular to axis X2 and a cylindrical skirt 104 centered on axis X2. V10 denotes the internal volume of part 10.

In the present description, axis X2 is supposed to be vertical on FIG. 1 and support 2 lies on a non represented horizontal surface by a lower edge 1042 of skirt 104. Thus, a part of holder 2 is to be an upper part when it is oriented towards the top of FIG. 1 and a lower part when it is oriented towards the bottom on this figure.

A notch 106 is made in skirt 104 and extends up to the edge 1042 of this skirt which is opposite to annular portion 102.

A second part 20 of holder 4 is defined between portion 102 and a disk 302 which belongs to a third part 30 of holder 4. Second part 20 includes a cylindrical wall 202 centered on axis X2 and having a circular cross-section, with a diameter inferior to the diameters of skirt 104 and disc 302, these diameters being substantially equal. V20 denotes the volume of part 20 defined, axially along axis X2, between portion 102 and disk 302 and radially, with respect to axis X2, outside cylindrical wall 202.

The third part 30 of holder 4 includes four arms 304 which are identical and regularly distributed, at 90°, around axis X2. Each arm extends globally parallel to axis X2 and is connected to a surface of disc 302 opposite to volume V20 via a respective reinforcing bracket 306. Each bracket 306 guarantees that the adjacent arm 304 remains parallel to axis X2, even if loaded in a direction parallel to axis X2.

At its upper end opposite to disc 302, each arm 304 is provided with a curved portion 308 which forms a concave recess V308 between a vertical wall 3082, in the form of a portion of a cylinder centered on axis X2, and a horizontal wall 3084 perpendicular to axis X2.

V30 denotes the volume of part 30 defined radially between arms 304 around axis X2. Volume V30 extends, along axis X2, from disc 302 up to the horizontal walls 3024 of curved portions 308. H30 denotes the axial height, measured along axis X2, of volume V30.

Holder 4 also includes a lug 50 which extends outwardly from skirt 104, along a direction A50 which is radial with respect to axis X2. Lug 50 is located next to notch 106 and provided, at its end opposite to skirt 104 with a concave gutter 502 which defines a concave recess V502 oriented radially outwardly with respect to axis X2.

According to an optional aspect of the invention, disc 302 is provided with several openings 303 which makes holder 4 lighter and easier to mold.

Adaptor 6 includes a base plate 61 and two rails 62 and 63 parallel to plate 61, which extend above this plate in mounted configuration of adaptor 6 on holder 4. Adaptor 6 also includes a protruding part 64 which extends on the same side as rails 62 and 63 with respect to base plate 61. Adaptor 6 also includes three pins 66, 67 and 68 which extend on the side of base plate 61 opposite to parts 62 to 64. Pin 67 is provided with a central slot and thus elastically deformable.

On the other hand, disc 302 is provided with three holes 305, each adapted to accommodate one of pins 66 to 68. Pins 66 to 68 and hole 305 allow to reversibly mount adaptor 6 in volume V30 of the third part 30 of holder 4.

Support member 2 is designed to hold a sensor unit 7 in a predefined configuration, this sensor unit being adapted to cooperate with a bearing 8 in order to constitute a bearing assembly B.

Bearing 80 includes a non-rotatable outer ring 82 and a rotatable inner ring 84 centered on a central axis X8 of bearing 8. A single row of balls 86 is mounted in a rotation chamber 87 of rolling 8 and held in position by a cage 88. D8 denotes the outer diameter of bearing 8.

An encoder washer 9 is fixedly mounted on inner ring 84 and includes several magnetic poles 92 adapted to generate a rotating magnetic field to be detected by several sensors 72 belonging to sensor unit 7 and embedded in an annular sensor body 74 of sensor unit 7.

X7 denotes the central axis of sensor body 74, which is aligned and superimposed with axis X8 when sensor body 74 is mounted on outer ring 82 by elastic deformation of some tabs 741 of sensor body 74.

Sensor unit 7 also includes an electric cable 76 which includes at least one, and preferably several, electrical conductor(s). Cable 76 is connected to a printed circuit board 77 of sensor unit 7 which is also embedded within sensor body 74 and holds sensor 72 in position. Cable 76 enters sensor body 74 along a direction A76 which is radial with respect to axis X7.

At its free end 761 opposite to sensor body 74, cable 76 is provided with a connector 78 having several pins 782 whose geometry and distribution are adapted to the intended use of the bearing assembly B formed of sensor unit 7, bearing 8 and target 9. Connector 78 also includes a plastic body 784. H78 denotes the maximum vertical thickness of body 784, which is measured parallel to axis X2.

Vertical thickness H78 is smaller than axial height H30 of volume V30.

First part 10 of support member 2 is designed and configured to accommodate a part of sensor body 74 within volume V10. More precisely, as shown on FIG. 9, sensor body 74 can be introduced within volume V10 in a configuration where axes X2 and X7 are superimposed. In this configuration, an outer shield 742 of sensor body 74, which forms an annular surface 743 perpendicular to axis X2, comes into surface contact with the lower face of annular portion 102 of first part 10. In this configuration, the outer radial surface 744 of sensor body 74 which is partly made by shield 742 is surrounded by skirt 104. The geometry of sensor body 74 and first part 10 of holder 4 can be chosen so that sensor body 74 can be elastically held within first part 10 thanks to an elastic deformation of cylindrical skirt 104. In particular, the outer diameter D7 of sensor body 7 can be chosen equal or slightly superior to the internal diameter of skirt 104, which is equal to the diameter of volume V10. In other words, volume V10 is substantially complementary to the shape of sensor body 74.

746 denotes a portion of sensor body 74 through which cable 76 enters sensor body 74. Portion 746 radially protrudes outwardly with respect to surface 744. In the configuration mentioned here-above, portion 746 is received within notch 106, which is compatible with the fact that cable 76 extends along radial direction X76 with respect to axis X7, within portion 746.

On the other hand, the geometry of adaptor 6 is designed on the basis of the geometry of connector 78 for what concerns its parts 62 to 64 which extend on the upper side of base plate 61 on FIG. 1. In other words, the geometry of adaptor 6 is customized on the basis of connector 78.

Figures 2, 3:
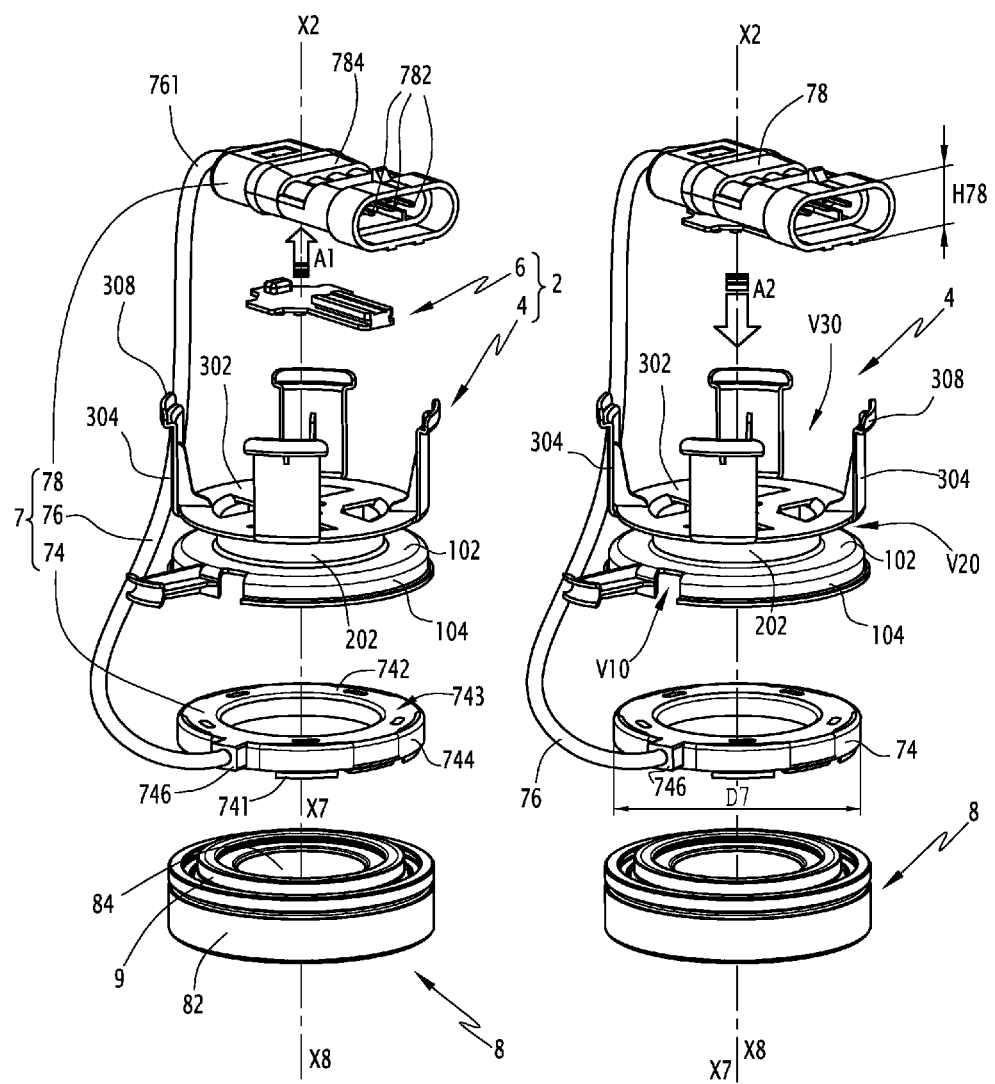

In a first step of using adaptor 2 with sensor unit 7, it is possible to mount adaptor 6 onto connector 78, as represented by arrow A1 on FIG. 2. This is obtained by cooperation of shapes between adaptor 6 and connector 78. Rails 62 and 63 and pivoting part 64 are designed to block plastic body 784.

One reaches the configuration of FIG. 3 where connector 78 and adaptor 6 can be introduced within volume V30 as represented by arrow A2. At the end of this step, the pins 66 to 68 of adaptor 6 are received within holes 305 of holder 4, so that connector 78 is received and immobilized within volume V30. This is the configuration represented on FIG. 4.

From this configuration, it is possible to wound cable 76 within volume V20 of the second part 20 of holder 2 by making successive turns of cable 76 around cylindrical wall 202. This is represented by arrow A3 on FIG. 4. When almost all of cable 76 is received within volume V20, it is possible to make the remaining portion of cable 76 go around gutter 502 and to introduce sensor body 74 within volume V10 as represented by arrow A4. One reaches then the configuration of FIG. 5 where a sensing sub-assembly A is formed by sensor unit 7 mounted on support member 2. In this configuration, a portion 762 of cable 76 is received within volume V502 of gutter 502, so that portion 746 of sensor body 74 is not subject to a shear stress, which would occur if cable 76 were to go directly from sensor body 74 to volume V20.

Sensing sub-assembly A is adapted to be mounted on bearing 8, as represented by arrow A5, in order to constitute an instrumented bearing assembly B, as represented on FIG. 6. Such an instrumented bearing is compatible with the detection of a rotation parameter of inner ring 84 by sensors 72.

Mounting of sub-assembly A on bearing 8 occurs by elastic deformation of tabs 741 which protrude axially out of volume V10 in the configuration of FIG. 5.

With this respect, support member 2 can be used to transmit an axial effort E for mounting sensor body 74 onto ring 82.

Sensor unit 7 in the configuration of FIG. 5 or bearing assembly B in the configuration of FIG. 6 are easily manipulated by a human operator or a robot in a very easy way, insofar as cable 76 does not hang on a side of the sensor body 74 or of the bearing 8.

Figure 8:
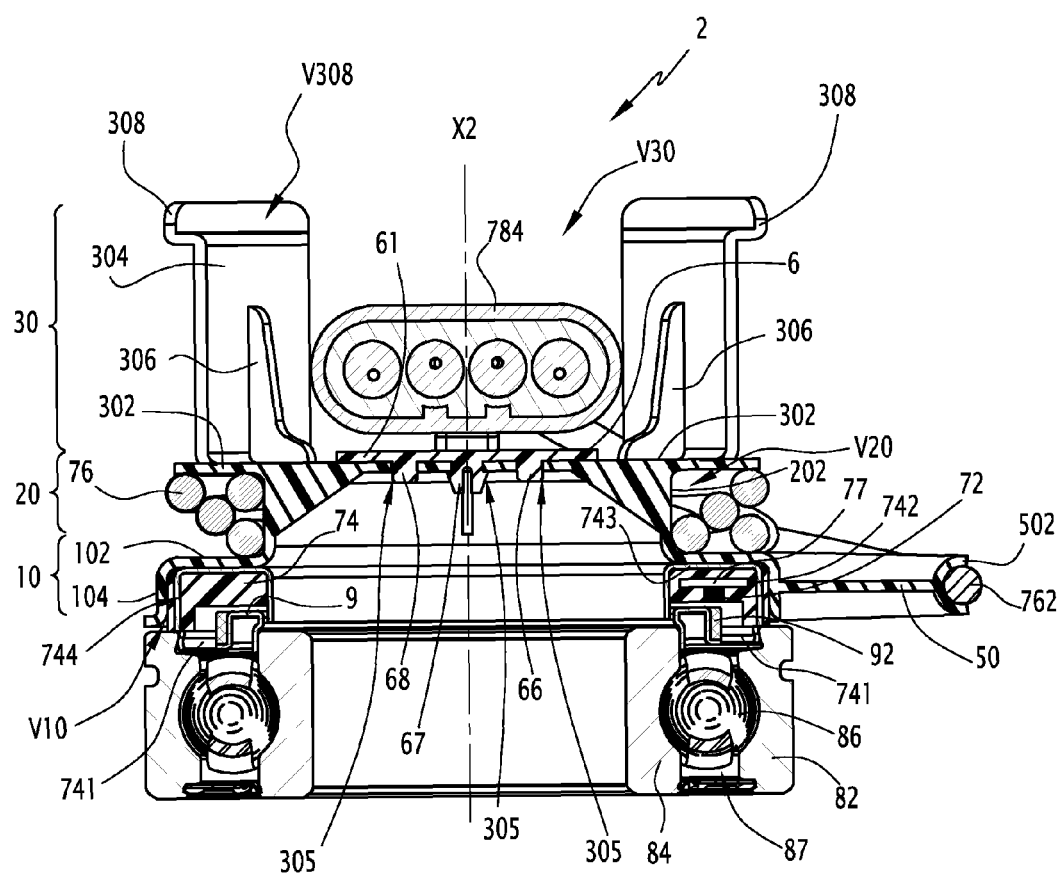
FIG. 8 is a cut view along line VIII-VIII on FIG. 7.
Figure 9:
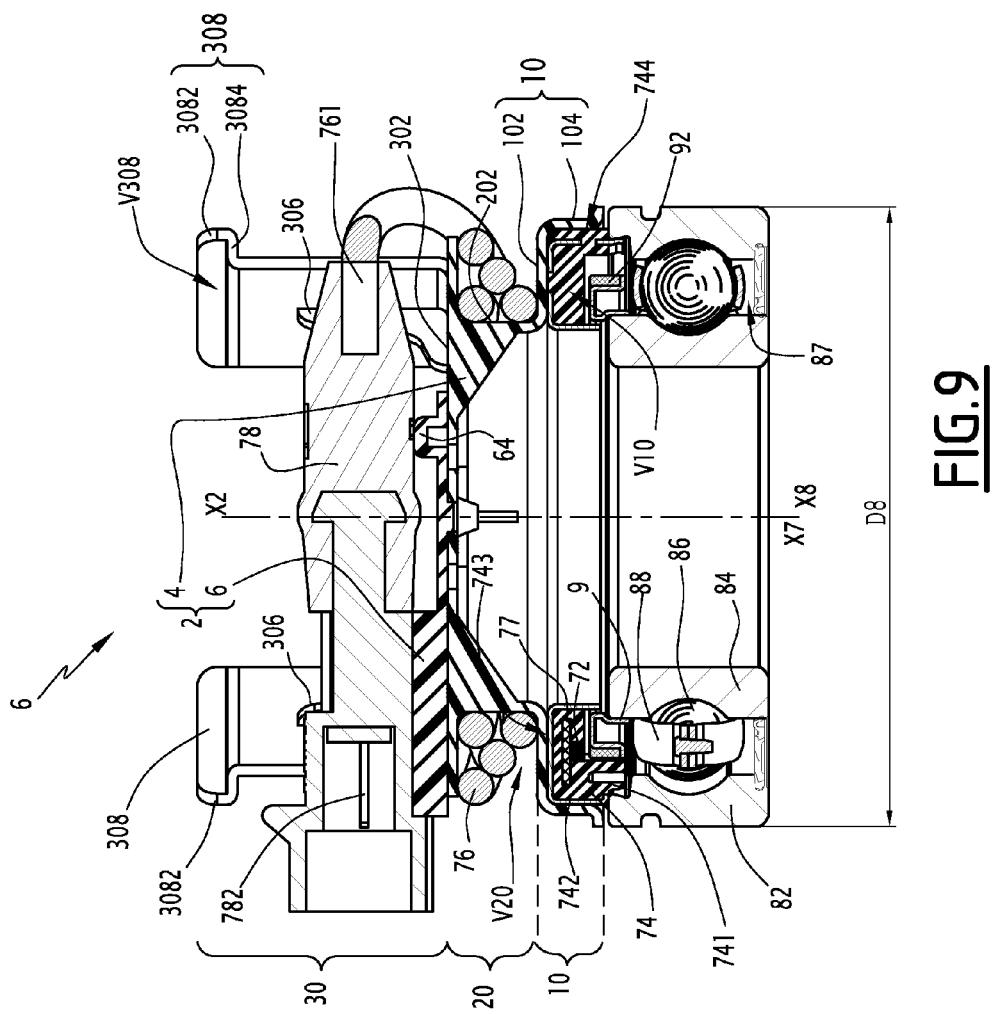
FIG. 9 is a cut view along line IX-IX on FIG. 7.

As represented on FIGS. 8 and 9, four coils are made by cable 76 within volume V20. This number of coils can be adapted, by adjusting the axial and radial dimensions of cylindrical wall 202, in order to take into account the actual length of cable 76.

Figure 7:
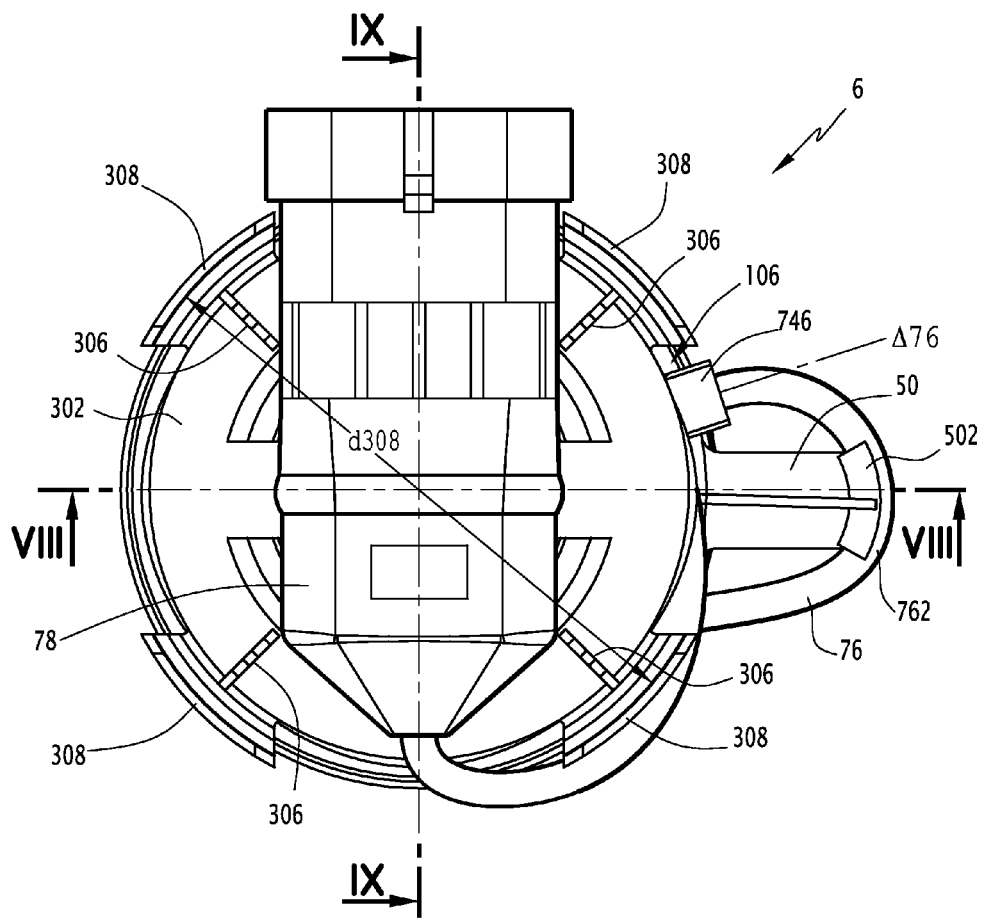
FIG. 7 is a top view of the bearing assembly of FIG. 6, at a larger scale.

As clearly visible on FIGS. 7 and 8, lug 50 allows to give to the part of cable 76 which is closest to sensor body 74 a configuration compatible, on the one hand, with the direction 1X76 of cable 76 entering within sensor body 74 and with the fact that this cable must be received within volume V20.

Figure 10:
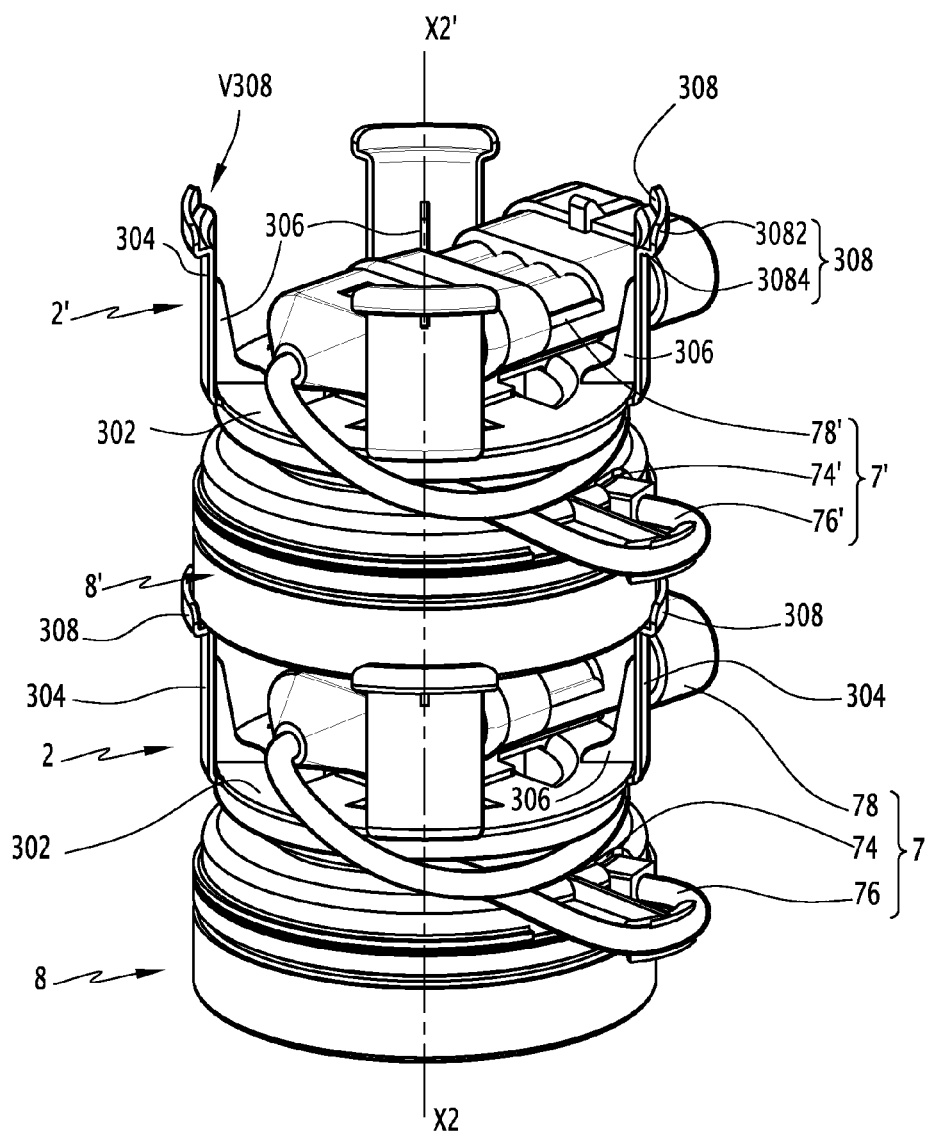
FIG. 10 is a perspective view of two bearing assemblies similar to the one of FIG. 6 stacked one above the other.

As represented on FIG. 10, the shape of arms 304 and of curved portions 308 is adapted to the geometry of fixed ring 82. More precisely, a maximum internal diameter d308 of recesses V308, which is defined between two opposite vertical walls 3082 of curved portions 308, is substantially identical to the outside diameter D8 of bearing 8, that is the outside diameter of ring 82. Here, "substantially identical" means that the ratio d308/D8 is between 0.90 and 1.10. It is thus, possible to partly introduce a bearing 8' in the respective recesses formed on the upper ends of the arms 304 of a first support member 2 in order to constitute a stack or pile of bearing assemblies respectively equipped with support members.

On FIG. 10, a stack of two such bearing assemblies B and B' is represented, each with one bearing 8 or 8' and one support member 2 or 2' holding one sensor unit 7 or 7' formed of a sensor body 74 or 74', a cable 76 or 76' and one connector 78 or 78'.

As visible on FIG. 10, the length of arms 304 is sufficient to accommodate connector 78 within volume V30 of the lower support member 2, without interfering with a bearing 8' of an upper bearing assembly B' received in the recesses V308 of these arms 304 distributed around this connector. In other words, since vertical height H78 of connector 78 is smaller than axial height H30 of volume V30, connector 78 does not prevent ring 82 to be partly inserted within recesses V308.

Thanks to lug 50, adaptor 2 does not risk to roll on a long distance when it falls on a flat surface, because lug 50 blocks the rotation of support member 2 around axis X2. This is due to the fact that lug 50 extends radially, with respect to axis X2, outwardly as compared to parts 10, 20 and 30. This is advantageous in the empty configuration of support member 2 represented on FIG. 1, in the loaded configurations represented on FIGS. 5 and 6 and in any intermediate configurations.

According to a non represented alternative embodiment of the invention, it is possible to use a disc 302 or a portion 102 with a larger diameter, large enough to extend radially, with respect to axis X2, outwardly as compared to lug 50. This makes adaptor 2 compatible with a rolling motion and can be adapted in some circumstances.

According to a non represented variant of the invention, it is also possible to stack several sensing sub-assemblies A represented on FIG. 5, in order to form a pile similar to the one of FIG. 10, but without bearings. In such a case, the sensor body 74 of a sensor unit is directly received within the curved portions 308 of a support member 2 located underneath and diameters d308 and D7 are substantially identical, that is the ratio d308/D7 is between 0.90 and 1.10.

The shape of skirt 104 can be adapted so that a larger portion of sensor body 74 protrudes axially from volume V10, in order for this portion to directly interact with the curved portions 308 of the arms of a similar support member located underneath.

According to a non represented alternative embodiment, sensor body 74 can be mounted on inner ring 84, whereas encoder washer 9 is mounted on outer ring 82.

The technical features of the embodiments and variant listed here-above can be combined in any technically feasible configuration.

The invention claimed is:

1. A temporary support member for a sensor unit of a bearing assembly, the temporary support member being stackable with a similar support member when a sensor unit is mounted on each one of the temporary support member and the similar support member, the temporary support member comprising:
   a first part for accommodating at least a part of a sensor body of the sensor unit;
   a second part for accommodating a cable connected to the sensor body in a coiled configuration; and
   a third part for accommodating a connector mounted at a free end of the cable,
   wherein the first part and the second part are circular and centered on a common axis, and
   wherein the second part is located between the first and third parts along the common axis.

2. The temporary support member according to claim 1 further comprising:
   curved portions each forming a recess for accommodating a part of another sensor body belonging to another sensor unit mounted on another temporary support member or a part of a bearing cooperating with the another sensor unit mounted on the another temporary support member.

3. The temporary support member according to claim 2, wherein the curved portions are provided at the free ends of arms which extend parallel to a central axis of the temporary support member and define between them a volume for accommodating the connector.

4. The temporary support member according to claim 3, wherein each recess is formed by a first cylindrical wall centered on the central axis and a second wall perpendicular to the central axis.

5. The temporary support member according to claim 3, wherein the arms belong to the third part.

6. The temporary support member according to claim 1, wherein the first, second and third parts are made in a single piece of synthetic material.

7. The temporary support member according to claim 6, further comprising an adaptor for holding the connector in position within the third part.

8. A sensing sub-assembly comprising:
   the temporary support member according to claim 1;
   the sensor unit with the sensor body;
   the cable connected to the sensor body; and
   the connector mounted at the free end of the cable,
   wherein the temporary support member is stackable with a similar support member when the sensor unit is mounted on each one of the temporary support member and the similar support member, and
   wherein the sensor unit is mounted onto the temporary support member.

9. The sensing sub-assembly according to claim 8, wherein the temporary support member provides
   an axial dimension, measured parallel to a central axis of the temporary support member, of a volume defined by the third part for accommodating the connector of the sensor unit is larger than a dimension of the connector which is parallel to the central axis when the connector is received within the volume.

10. The sensing assembly according to claim 9, wherein the sensor body is received within a first volume of the first part of the temporary support member, the cable is wound in a second volume of the second part of the temporary support member and the connector is received within a third volume of the part of the temporary support member.

11. A bearing assembly comprising:
    a bearing having a rotating ring;
    a non-rotating ring; and
    an encoder washer mounted on the rotating ring,
    wherein the bearing assembly includes a sensing sub-assembly mounted on the non-rotating ring and the temporary support member according to claim 1, the temporary support member including the sensor body, the cable and the connector,
    wherein the sensor body is received within a first volume of the first part of the temporary support member, the cable is wound in a second volume of the second part of the temporary support member and the connector is received within a third volume of the third part of the temporary support member.

12. The bearing assembly according to claim 11, wherein the temporary support member includes curved portions each forming a recess for accommodating a part of a sensor body belonging to a sensor unit mounted on another temporary support member or a part of a bearing cooperating with a sensor unit mounted on another temporary support member, and
    wherein the recesses formed by the curved portions are distributed around a central axis of the temporary support member with a maximum diameter which is substantially identical to the outside diameter of the bearing or to the outside diameter of the sensor body.

13. A temporary support member for a sensor unit of a bearing assembly, the temporary support member being stackable with a similar support member when a sensor unit is mounted on each one of the temporary support member and the similar support member, the temporary support member comprising:
    curved portions each forming a recess for accommodating a part of a sensor body belonging to a sensor unit mounted on another temporary support member or a part of a bearing cooperating with a sensor unit mounted on the another temporary support member.

14. The temporary support member according to claim 13, wherein the curved portions are provided at free ends of arms which extend parallel to a central axis of the temporary support member and define between them a volume for accommodating a connector belonging to the sensor unit.

15. The temporary support member according to claim 14, wherein each recess is formed by a first cylindrical wall centered on the central axis and a second wall perpendicular to the central axis.

16. A bearing assembly comprising:
    a bearing having a rotating ring;
    a non-rotating ring; and
    an encoder washer mounted on the rotating ring,
    wherein the bearing assembly includes a sensing sub-assembly mounted on the non-rotating ring and including;
    a sensor unit having a sensor body;
    a first part for accommodating at least a part of the sensor body;
    a cable connected to the sensor body;
    a second part for accommodating the cable in a coiled configuration; and
    a connector mounted at a free end of the cable;
    a third part for accommodating the connector, and
    wherein the sensor body is received within a first volume of the first part of the temporary support member, the cable is wound in a second volume of the second part of the temporary support member and the connector is received within a third volume of the third part of the temporary support member, wherein the temporary support member includes curved portions each forming a recess for accommodating a part of a sensor body belonging to a sensor unit mounted on another temporary support member or a part of a bearing cooperating with a sensor unit mounted on another temporary support member, and wherein the recesses formed by the curved portions are distributed around a central axis of the temporary support member with a maximum diameter which is substantially identical to the outside diameter of the bearing or to the outside diameter of the sensor body.

* * * * *